United States Patent
Shao et al.

(10) Patent No.: US 12,335,355 B2
(45) Date of Patent: *Jun. 17, 2025

(54) METHODS AND INTERNET OF THINGS SYSTEMS FOR INFORMATION STORAGE MANAGEMENT BASED ON SMART GAS DATA CENTERS

(71) Applicant: CHENGDU QINCHUAN IOT TECHNOLOGY CO., LTD., Sichuan (CN)

(72) Inventors: Zehua Shao, Chengdu (CN); Yaqiang Quan, Chengdu (CN); Lei He, Chengdu (CN); Junyan Zhou, Chengdu (CN)

(73) Assignee: CHENGDU QINCHUAN IOT TECHNOLOGY CO., LTD., Chengdu (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/751,378

(22) Filed: Jun. 24, 2024

(65) Prior Publication Data

US 2024/0348701 A1    Oct. 17, 2024

Related U.S. Application Data

(63) Continuation of application No. 18/459,350, filed on Aug. 31, 2023, now Pat. No. 12,058,228.

(30) Foreign Application Priority Data

Aug. 4, 2023   (CN) .......................... 202310976461.1

(51) Int. Cl.
*H04L 67/60*   (2022.01)
*G06F 16/23*   (2019.01)
(Continued)

(52) U.S. Cl.
CPC .......... *H04L 67/60* (2022.05); *G06F 16/2379* (2019.01); *G06F 16/245* (2019.01); *G16Y 10/35* (2020.01); *G16Y 40/35* (2020.01)

(58) Field of Classification Search
CPC ... G06F 16/2379; G06F 16/245; G16Y 10/35; G16Y 40/35; H04L 67/1396; H04L 67/60; G06Q 10/103; G06Q 50/06; Y04S 10/50
See application file for complete search history.

(56) References Cited

U.S. PATENT DOCUMENTS

| 11,210,009 B1 | 12/2021 | Freilich et al. |
| 11,507,064 B2 | 11/2022 | Cella et al. |

(Continued)

FOREIGN PATENT DOCUMENTS

| CN | 105741186 A | 7/2016 |
| CN | 109712052 A | 5/2019 |

(Continued)

OTHER PUBLICATIONS

Yao, Haifeng et al., A Conception for Building Intelligent Gas System at Steel Enterprises, Metallurgical Power, 6: 30-31&34, 2018.

(Continued)

*Primary Examiner* — James E Richardson
(74) *Attorney, Agent, or Firm* — METIS IP LLC

(57) ABSTRACT

Methods and Internet of Things (IoT) systems for information storage management based on a smart gas data center are provided. The method includes: when a smart gas platform stores data in the smart gas data center, determining an extraction feature and a value feature of sub-target data of target data; and determining a storage level of the sub-target data based on the extraction feature and the value feature of the sub-target data and storing the sub-target data in the smart gas data center according to the storage level;

(Continued)

and when the smart gas platform reads the data from the smart gas data center: determining transmission execution data based on a transmission load and an importance score of a target smart gas platform and transmitting the data to the target smart gas platform based on the transmission execution data.

16 Claims, 4 Drawing Sheets

(51) Int. Cl.
 *G06F 16/245* (2019.01)
 *G16Y 10/35* (2020.01)
 *G16Y 40/35* (2020.01)

(56) References Cited

U.S. PATENT DOCUMENTS

| | | | | |
|---|---|---|---|---|
| 2016/0105509 | A1* | 4/2016 | Iizawa | H04L 43/0882 |
| | | | | 709/219 |
| 2018/0284753 | A1* | 10/2018 | Cella | G06N 3/047 |
| 2018/0284758 | A1 | 10/2018 | Cella et al. | |
| 2019/0041835 | A1 | 2/2019 | Cella et al. | |
| 2019/0324444 | A1 | 10/2019 | Cella et al. | |
| 2020/0103894 | A1 | 4/2020 | Cella et al. | |
| 2022/0276997 | A1 | 9/2022 | Li et al. | |
| 2023/0222384 | A1* | 7/2023 | Shao | G06Q 50/06 |
| | | | | 702/187 |

FOREIGN PATENT DOCUMENTS

| | | |
|---|---|---|
| CN | 114218216 A | 3/2022 |
| CN | 115358432 A | 11/2022 |
| CN | 115410610 A | 11/2022 |
| CN | 115439003 A | 12/2022 |
| CN | 115640915 A | 1/2023 |
| CN | 116187724 A | 5/2023 |
| CN | 116506470 A | 7/2023 |

OTHER PUBLICATIONS

First Office Action in Chinese Application No. 202310976461.1 mailed on Sep. 19, 2023, 11 pages.
Notification to Grant Patent Right for Invention in Chinese Application No. 202310976461.1 mailed on Oct. 16, 2023, 4 pages.

* cited by examiner

METHODS AND INTERNET OF THINGS SYSTEMS FOR INFORMATION STORAGE MANAGEMENT BASED ON SMART GAS DATA CENTERS

CROSS-REFERENCE TO RELATED APPLICATION

This application is a continuation of US patent application Ser. No. 18/459,350, filed on Aug. 31, 2023, which claims priority of Chinese Patent Application No. 202310976461.1, filed on Aug. 4, 2023, the contents of which are entirely incorporated herein by reference.

TECHNICAL FIELD

The present disclosure relates to the technical field of gas data management, and in particular, to methods and Internet of Things systems for information storage management based on a smart gas data center.

BACKGROUND

With the improvement of living standards, gas systems have been commonly used in people's lives. Data management of the gas system is an important part of providing efficient service to users. Having a data center that can efficiently store gas data is a key to saving resources and improving the system processing efficiency.

Aiming at the problem of how to process efficiently the gas data, CN105741186A proposes methods and systems for processing pipeline gas data based on user levels, which provides convenience for gas users using methods for processing preset pipeline gas data corresponding to different levels of pipeline gas users according to different levels of pipeline gas users. However, a source of the gas data is not only limited to the gas users, but it is necessary to extract a corresponding information feature of gas data of other sources to determine classification of gas data processing, so as to carry out corresponding hierarchical storage management.

In view of this, it is desirable to provide methods and Internet of Things systems for information interaction management based on a smart gas data center, which can hierarchically store and manage gas data and achieve the purpose of efficient operation and resource-saving.

SUMMARY

One of the embodiments of the present disclosure provides a method for information storage management based on a smart gas data center. The method includes: when a smart gas platform stores data in the smart gas data center, determining, by the smart gas data center, a scheduling resource of target data based on a source platform corresponding to the target data; obtaining, by the smart gas data center, the target data of a preset data volume from the source platform based on the scheduling resource; determining, by the smart gas data center, historical sub-target data corresponding to sub-target data of the target data in internal storage data of the smart gas data center based on a data type and a data source object of the sub-target data; determining, by the smart gas data center, the extraction feature of the sub-target data based on an extraction frequency of the historical sub-target data; determining, by the smart gas data center, a value feature of the sub-target data based on an object importance of a data source object of the sub-target data; and determining, by the smart gas data center, a storage level of the sub-target data based on the extraction feature and the value feature of the sub-target data and storing the sub-target data in the smart gas data center according to the storage level; and when the smart gas platform reads the data from the smart gas data center, determining, by the smart gas data center, transmission execution data based on a transmission load and an importance score of a target smart gas platform and transmitting the data to the target smart gas platform based on the transmission execution data.

One embodiment of the present disclosure provides an Internet of Things (IoT) system for information storage management based on a smart gas data center. The IoT system includes a smart gas user platform, a smart gas service platform, a smart gas management platform, a smart gas sensing network platform, and a smart gas object platform. The smart gas management platform includes the smart gas data center. When a smart gas platform stores data in the smart gas data center, the smart gas data center determines a scheduling resource of target data based on a source platform corresponding to the target data; the smart gas data center obtains the target data of a preset data volume from the source platform based on the scheduling resource; the smart gas data center determines historical sub-target data corresponding to sub-target data of the target data in internal storage data of the smart gas data center based on a data type and a data source object of the sub-target data; determines the extraction feature of the sub-target data based on an extraction frequency of the historical sub-target data; and determines a value feature of the sub-target data based on an object importance of a data source object of the sub-target data; and the smart gas data center determines a storage level of the sub-target data based on the extraction feature and the value feature of the sub-target data and stores the sub-target data in the smart gas data center according to the storage level. When the smart gas platform reads the data from the smart gas data center, the smart gas data center determines transmission execution data based on a transmission load and an importance score of a target smart gas platform and transmits the data to the target gas platform based on the transmission execution data.

One of the embodiments of the present disclosure provides a non-transitory computer-readable storage medium storing computer instructions. When reading the computer instructions in the storage medium, a computer executes the method described above.

Some embodiments of the present disclosure have at least one following beneficial effects: (1) the scheduling resource may be determined based on the source platform of the target data, so that the target data of a preset data volume may be obtained from the source platform, thereby avoiding storing too much invalid data in the smart gas data center; (2) the extraction feature and the value feature of each piece of sub-target data of the target data may be determined, so that the sub-target data can be better stored according to the storage level, thereby improving storage efficiency and reliability; and (3) the transmission execution data may be determined based on the transmission load and the important score of the target smart gas platform, which can better ensure the transmission effect and improve the operation efficiency of the platform.

BRIEF DESCRIPTION OF THE DRAWINGS

The present disclosure is further illustrated in terms of exemplary embodiments. These exemplary embodiments are described in detail with reference to the drawings. These embodiments are non-limiting exemplary embodiments, in which like reference numerals represent similar structures, wherein.

DETAILED DESCRIPTION

Figure 1:
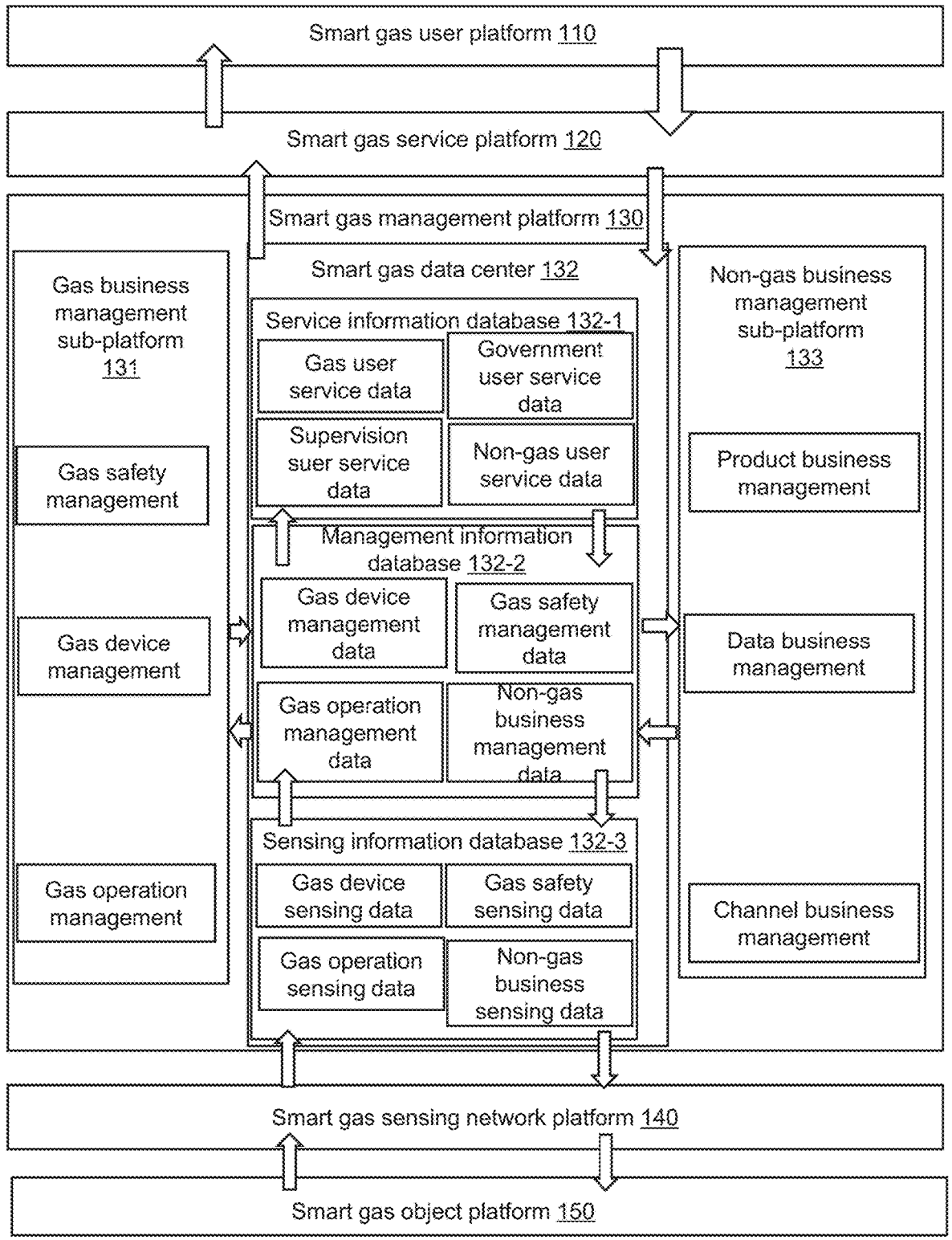
FIG. 1 is a schematic diagram illustrating an exemplary platform structure of an Internet of Things (IoT) system for information interaction management based on a smart gas data center according to some embodiments of the present disclosure.

In order to more clearly illustrate the technical solutions related to the embodiments of the present disclosure, a brief introduction of the drawings referred to the description of the embodiments is provided below. Obviously, the drawings described below are only some examples or embodiments of the present disclosure. Those having ordinary skills in the art, without further creative efforts, may apply the present disclosure to other similar scenarios according to these drawings. Unless obviously obtained from the context or the context illustrates otherwise, the same numeral in the drawings refers to the same structure or operation.

It should be understood that the "system," "device," "unit," and/or "module" used herein are one method to distinguish different components, elements, parts, sections, or assemblies of different levels. However, if other words can achieve the same purpose, the words can be replaced by other expressions.

As used in the disclosure and the appended claims, the singular forms "a," "an," and "the" include plural referents unless the content clearly dictates otherwise; the plural forms may be intended to include singular forms as well. In general, the terms "comprise," "comprises," and/or "comprising," "include," "includes," and/or "including," merely prompt to include steps and elements that have been clearly identified, and these steps and elements do not constitute an exclusive listing. The methods or devices may also include other steps or elements.

The flowcharts used in the present disclosure illustrate operations that the system implements according to the embodiment of the present disclosure. It should be understood that the foregoing or following operations may not necessarily be performed exactly in order. Instead, the operations may be processed in reverse order or simultaneously. Besides, one or more other operations may be added to these processes, or one or more operations may be removed from these processes.

FIG. 1 is a schematic diagram illustrating an exemplary platform structure of an Internet of Things (IoT) system for information interaction management based on a smart gas data center according to some embodiments of the present disclosure. The IoT system for information interaction management based on a smart gas data center involved in the embodiments of the present disclosure is described in detail below. It should be noted that the following embodiments are used only for the purpose of illustration and do not constitute a limitation of the present disclosure.

In some embodiments, as shown in FIG. 1, the IoT system 100 for information interaction management based on a smart gas data center (hereinafter referred to as the IoT system 100) includes a smart gas user platform 110, a smart gas service platform 120, a smart gas management platform 130, a smart gas sensing network platform 140, and a smart gas object platform 150 connected in sequence.

The smart gas user platform 110 may be a platform that interacts with a user. In some embodiments, the smart gas user platform 110 may be configured as a terminal device.

The smart gas service platform 120 may be a platform that provides information/data transmission and interaction. For example, the smart gas service platform 120 may obtain gas data, etc. from the smart gas management platform 130 and send the gas data, etc. to the smart gas user platform 110.

The smart gas management platform 130 may be a platform that coordinates and integrates connection and collaboration between functional platforms and provides functions of perception management and control management.

In some embodiments, the smart gas management platform 130 may include a gas business management sub-platform 131, a non-gas business management sub-platform 133, and a smart gas data center 132.

The gas business management sub-platform 131 may be a platform configured to manage gas business. In some embodiments, the gas business management sub-platform 131 may be used to perform gas safety management, gas device management, and gas operation management.

The non-gas business management sub-platform 133 may be a platform configured to manage non-gas business. In some embodiments, the non-gas business management sub-platform 133 may be used to perform product business management, data business management, and channel business management.

The smart gas data center 132 may be used to store and manage all operational information of the IoT system 100. In some embodiments, the smart gas data center 132 may be configured as a storage device configured to store data related to gas information, etc.

In some embodiments, the smart gas data center 132 may include a service information database 132-1, a management information database 132-2, and a sensing information database 132-3. The service information database 132-1 is used to store service information data, including gas user service data, government user service data, supervision user service data, and non-gas user service data. The management information database 132-2 is used to store management information data, including gas device management data, gas safety management data, gas operation management data, and non-gas business management data. The sensing information database 132-3 is used to store sensing information data, including gas device sensing data, gas safety sensing data, gas operation sensing data, and non-gas business sensing data.

The management information database 132-2 interacts bi-directionally with the sensing information database 132-3 and the service information database 132-1, respectively. The sensing information database 132-3 interacts with the smart gas sensing network platform 140 for information, and the service information database 132-1 interacts with the smart gas service platform 120 for information. The gas business management sub-platform 131 and the non-gas business management sub-platform 133 interact with the management information database 132-2 for information, obtain corresponding management data from the management information database 132-2, and send a management instruction to the management information database 132-2. The management information database 132-2 further sends the management instruction to the service information database 132-1 or the sensing information database 132-3 as required by the instruction to realize external transmission of information.

In some embodiments, the smart gas management platform 130 may interact with the smart gas service platform 120 and the smart gas sensing network platform 140 through the smart gas data center 132, respectively. For example, the smart gas data center 132 may send the gas data to the smart gas service platform 120. As another example, the smart gas data center 132 may send an instruction for obtaining gas data to the smart gas sensing network platform 140 to obtain the gas data.

The smart gas sensing network platform 140 may be a functional platform that manages sensing communication. In some embodiments, the smart gas sensing network platform 140 may be configured as a communication network and gateway to fulfill functions of perceptual information sensing communication and control information sensing communication.

The smart gas object platform 150 may be a functional platform that generates perceptual information and executes control information. In some embodiments, the smart gas object platform 150 may be configured as a gas device that stores data in the smart gas data center or reads data from the smart gas data center. Exemplary gas devices include but are not limited to, a gas meter, a valve control device, a gas flow meter, etc.

Figure 2:
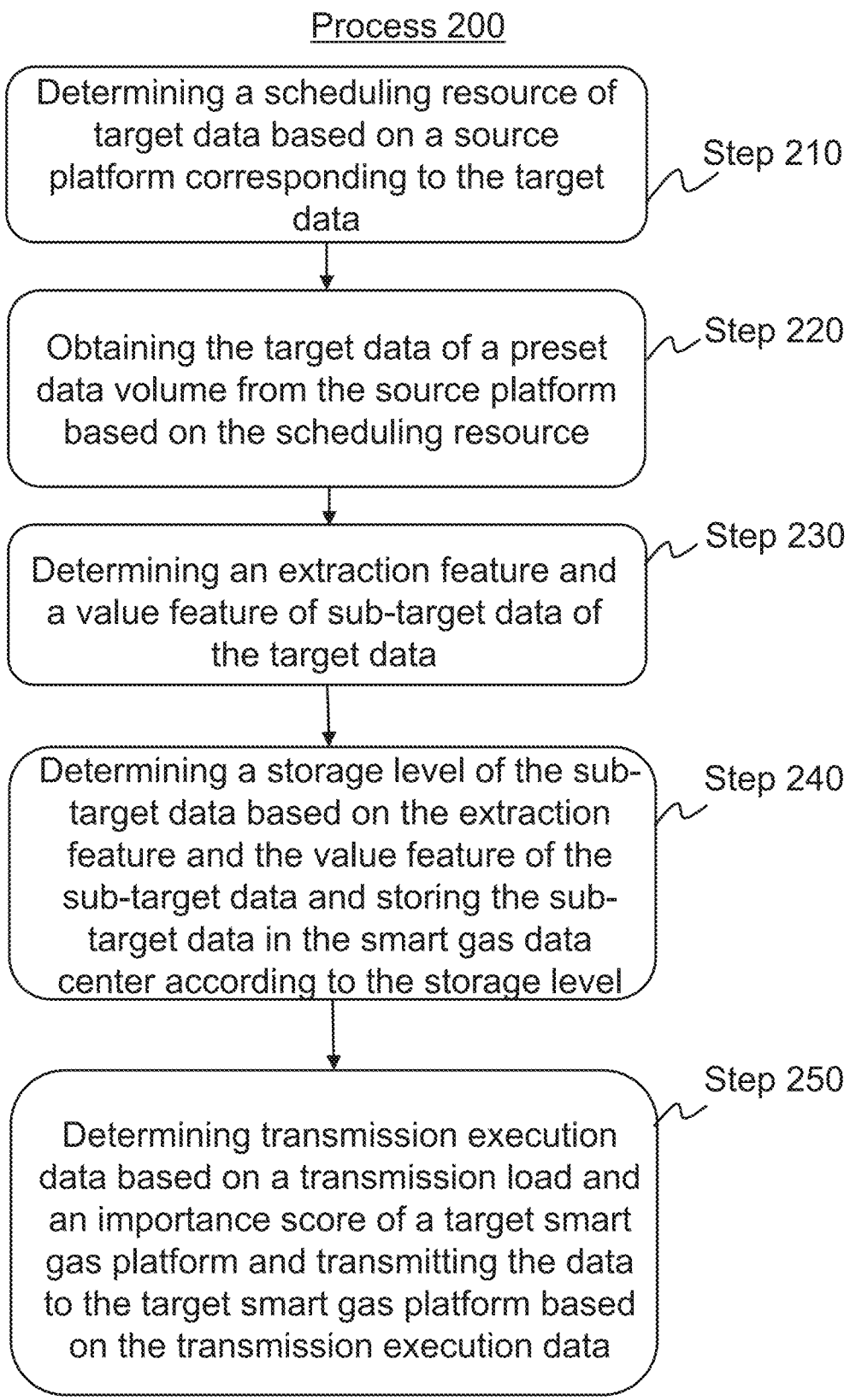
FIG. 2 is a flowchart illustrating an exemplary process for managing information interaction based on a smart gas data center according to some embodiments of the present disclosure.

FIG. 2 is a flowchart illustrating an exemplary process for managing information interaction based on a smart gas data center according to some embodiments of the present disclosure. In some embodiments, the process 200 may be executed by a smart gas data center. As shown in FIG. 2, the process 200 includes the following operations. It is noted that the smart gas data center performs the operations 210-240 when a smart gas platform stores data in the smart gas data center. When the smart gas platform reads the data from the smart gas data center, the smart gas data center performs the operation 250. The operation 250 and operations 210-240 are executed independently of each other, and an order in which the operations are executed is not limited in the present disclosure.

In 210, determining a scheduling resource of target data based on a source platform corresponding to the target data.

The target data is data stored by the source platform in the smart gas data center. In some embodiments, the target data may be at least one of gas service data, gas management data, or gas sensing data.

In some embodiments, the gas service data may include at least one of gas user service data, government user service data, supervision user service data, or non-gas user service data. The gas user is a user who uses gas. The government user is a user responsible for gas operation. The supervision user is a user of a safety supervision department. The non-gas user is a user who does not use gas, e.g., a dealer.

In some embodiments, the gas management data may be at least one of gas device management data, gas safety management data, gas operation management data, or non-gas business management data.

In some embodiments, the gas sensing data may be at least one of gas device sensing data, gas safety sensing data, gas operation sensing data, or non-gas business sensing data. The gas device sensing data includes sensing data of an indoor gas device and a pipeline network gas device. The gas safety sensing data may include maintenance data of an indoor gas device and a pipeline network gas device. The gas operation sensing data may include a gas work order assessment result, gas work order acceptance information, etc. A gas work order includes a maintenance work order, an inspection work order, etc. The non-gas business sensing data includes product business data, data business data, channel business data, etc.

The source platform is the smart gas platform that stores data in the smart gas data center. The source platform may include at least one of a smart gas service platform, a gas business management sub-platform, a non-gas business management sub-platform, or a smart gas sensing network platform.

In some embodiments, the source platform is associated with a type of the target data. For example, the target data is the gas service data, and a source platform corresponding to the gas service data is the smart gas service platform, i.e., the gas service data may be uploaded from the smart gas service platform to the smart gas data center. For example, if the target data is the gas management data, a source platform corresponding to the gas management data may be one of the gas business management sub-platform and the non-gas business management sub-platform, i.e., the gas management data may be uploaded from the gas business management sub-platform and/or the non-gas business management sub-platform to the smart gas data center. For example, if the target data is the gas sensing data, a source platform corresponding the gas sensing data may be the smart gas sensing network platform, i.e., the gas sensing data may be uploaded from the smart gas sensing network platform to the smart gas data center.

The scheduling resource refers to a storable data volume that the smart gas data center allocates to target data of different sources. The target data of different sources refer to target data from different source platforms.

In some embodiments, the smart gas data center may determine the scheduling resource based on the source platform of the target data. For example, the smart gas data center may determine the scheduling resource corresponding to the target data of each source platform based on a corresponding relationship between different source platforms and different scheduling resources.

In 220, obtaining the target data of a preset data volume from the source platform based on the scheduling resource.

In some embodiments, the preset data volume may be a storable data volume of the target data in the scheduling resource. The target data of different sources corresponds to a preset data volume respectively.

In some embodiments, the smart gas data center may determine a preset data volume of the target data of different sources according to the storable data volume of the target data of different sources in the scheduling resource and extract the corresponding target data of the preset data volume from the different source platforms.

In 230, determining an extraction feature and a value feature of sub-target data of the target data.

The sub-target data is a single piece of data of the target data. A volume of the sub-target data contained in the target data is equal to a volume of the target data.

The extraction feature is a relevant feature when the sub-target data is extracted from a source platform corresponding to the sub-target data to the smart gas data center.

In some embodiments, the extraction feature includes an extraction frequency.

The extraction frequency is a count of times the sub-target data has been extracted in a preset period of time. The preset period of time may be set by the system or manually.

In some embodiments, the extraction frequency may be determined based on historical data. For example, the smart gas data center may determine the extraction frequency of the sub-target data in the preset period of time through statistics. In some embodiments, the smart gas data center may also determine historical sub-target data corresponding to the sub-target data in internal storage data of the smart gas data center and determine the extraction feature of the sub-target data based on the extraction frequency of the historical sub-target data. The historical sub-target data corresponding to the sub-target data is data same as current sub-target data in the internal storage data. The internal storage data is data that has been already stored in the smart gas data center. More descriptions regarding the determining the extraction feature may be found in FIG. 3 of the present disclosure and the relevant descriptions thereof.

In some embodiments, the extraction frequency may be determined based on extraction sub-frequencies of the sub-target data of different user types. The user types may include a gas user, a gas maintainer, a gas manager, etc. Accordingly, an extraction frequency of a certain piece of sub-target data may be determined based on an extraction sub-frequency of the sub-target data of the gas user, an extraction sub-frequency of the sub-target data of the gas maintainer, and an extraction sub-frequency of the sub-target data of the gas manager. For example, the extraction frequency of the certain piece of sub-target data may be a weighted result of the extraction sub-frequencies of the sub-target data of the different user types. The extraction sub-frequencies of the sub-target data of the different user types may be determined based on the historical data, please see the relevant descriptions above for more descriptions.

In some embodiments, the extraction feature further includes an average value of a data volume of extracted data each time the historical sub-target data is extracted. The extracted data refers to data that is extracted along with the historical sub-target data.

For data that needs to be extracted in a large volume or data that is extracted frequently, a relatively upper storage location may be utilized to store the data because upper data is extracted faster compared to lower data. In some embodiments of the present disclosure, the extraction feature may further include the average value of the data volume of extracted data each time the historical sub-target data is extracted, and a storage level of the sub-target data may be adjusted according to the data volume of extracted data, which facilitates a more convenient and rapid extraction of data.

The value feature is a feature related to a value of the sub-target data. The higher the value of the sub-target data, the higher security level, the longer storage time, and the faster reading speed of a storage location where the sub-target data is stored.

In some embodiments, the value feature may include an importance of the sub-target data. The value of the sub-target data may be measured by the importance.

In some embodiments, the smart gas data center may determine the value feature of the sub-target data based on the source platform of the target data. The operation of "determining the value feature of the sub-target data based on the source platform of the target data" is similar to the operation of "determining the extraction feature of the sub-target data based on the source platform of the target data." More descriptions may be found above.

In some embodiments, the importance of the sub-target data may be equal to an object importance of a data source object. In some embodiments, the smart gas data center may determine the value feature of the sub-target data based on the object importance of the data source object. More descriptions regarding the determining the value feature may be found in FIG. 4 of the present disclosure and the relevant descriptions thereof.

In 240, determining a storage level of the sub-target data based on the extraction feature and the value feature of the sub-target data and storing the sub-target data in the smart gas data center according to the storage level.

The storage level is a level of a storage location of the sub-target data in the smart gas data center. The higher the level of the storage location, the faster the data may be stored and extracted. For example, the level of the storage location may be 2-5 levels, generally less than or equal to 5 levels; The smaller the number of the level of the storage location, the higher the level of the storage location.

In some embodiments, the storage level may be determined based on the extraction feature and the value feature of the sub-target data. In some embodiments, the smart gas data center may pre-record and save a table of different storage levels corresponding to different extraction features and different value features respectively. After obtaining the extraction feature and the value feature of the sub-target data, the smart gas data center may determine the storage level by looking up the table, etc.

In some embodiments, the smart gas data center may determine an information feature of the sub-target data based on the extraction feature and the value feature of the sub-target data; and determine the storage level of the sub-target data based on the information feature.

The information features are a feature related to the extraction feature and the value feature of the sub-target data.

In some embodiments, the information feature is determined by a weighted summation of the extraction feature and the value feature of the sub-target data. For example, the information feature may be a sum of weight 1*extraction frequency, weight 2*average value of a data volume of extracted data, and weight 3*importance. Each weight may be set by the system or manually.

In some embodiments, the information feature is also related to an important score of the source platform of the sub-target data. Accordingly, the information feature may be determined by a weighted summation of the extraction feature, the value feature, and the importance score of the source platform of the sub-target data. For example, the information feature may be a sum of weight 1*extraction frequency, weight 2*average value of a data volume of extracted data, weight 3*importance, and weight 4*importance score of the source platform. Each weight may be set by the system or manually.

More descriptions regarding the importance score may be found in the operation 250 and the relevant descriptions thereof.

In the embodiments of the present disclosure, the extraction feature and the value feature of the sub-target may be further determined by determining the information feature based on the importance score of the source platform of the sub-target data, which makes the determination of the information feature more reliable.

In some embodiments, the smart gas data center may determine the storage level of the sub-target data through a preset rule based on the information feature. In some embodiments, the preset rule may be that the larger the information feature, the higher the storage level of the sub-target data corresponding to the information feature. For example, the storage level has two layers, layer 0 and layer 1. If the information feature is greater than a first threshold, the sub-target data is stored in the layer 0. If the information feature is greater than a second threshold, the sub-target data is stored in the layer 1. The first threshold is greater than the second threshold, and the first threshold and the second threshold may be set by the system or manually.

In the embodiment of the present disclosure, by determining the information feature and then determining the storage level of the sub-target data, relevant importance information of the sub-target data is accurately extracted to determine a priority level of a storage location of the sub-target data, which can improve the efficiency and accuracy of the determination of the storage level of the sub-target data.

In some embodiments, the smart gas data center may store the sub-target data at a storage location corresponding to the storage level in the gas data center based on the storage level of the sub-target data. A corresponding relationship between the storage level and the storage location is set by the system or manually.

In some embodiments, before storing the sub-target data in the gas data center according to the storage level, the smart gas data center may determine transfer data in the internal storage data of the smart gas data center. After performing preset processing on the transfer data, the smart gas data center may store the sub-target data in the gas data center according to the storage level.

Since a storage capacity of each storage location at each level is limited, in order to free up storage space, it is necessary to transfer some of storage data (i.e., the transfer data) from a current storage location to other storage locations before storing new data.

In some embodiments, the smart gas data center may determine a retention score of each sub-target data in the internal storage data. The smart gas data center may arrange each sub-target data in a descending order according to the retention score and determine a preset volume of sub-target data with a smallest retention score as the transfer data. In some embodiments, the preset volume is related to a current volume of data to be stored. For example, the preset volume may be equal to the current volume of data to be stored.

In some embodiments, the retention score of the sub-target data is determined by an extraction frequency, a time threshold, and a storage time of stored sub-target data. The stored sub-target data is sub-target data of the internal storage data in the smart gas data center. The time threshold is a maximum amount of time that data is allowed to be stored at a certain level, and the time threshold may be positively correlated with the value feature of the data.

In some embodiments, an exemplary equation of determining the retention score is:

$$S = p \times \frac{r}{t} \quad (1)$$

where S denotes the retention score, p denotes the extraction frequency of the stored sub-target data, r denotes the time threshold, and t denotes the storage time.

In some embodiments, the preset processing performed on the transfer data includes transferring the transfer data to a lower storage location, deleting the transfer data, etc.

In the embodiment of the present disclosure, before storing the new data in the smart gas data center, it is possible to determine which data stored in the smart gas data center may be transferred to the lower storage location, which effectively ensures the flexibility of a storage operation and prevents the storage operation from failing due to insufficient storage space.

When the gas platform reads data from the smart gas data center, the smart gas data center performs the operation 250.

In 250, determining transmission execution data based on a transmission load and an importance score of a target smart gas platform, and transmitting the data to the target smart gas platform based on the transmission execution data.

The transmission load is a volume of data transmitted by the target smart gas platform. In some embodiments, the transmission load may be obtained based on the smart gas sensing network platform and/or the smart gas service platform.

The target smart gas platform refers to a smart gas platform that initiates a data obtaining request. For example, the target smart gas platform may be at least one of the smart gas service platform, the gas business management sub-platform, the non-gas business management sub-platform, or the smart gas sensing network platform.

The importance score refers to a score that measures the importance of the gas platform. In some embodiments, the importance score relates to an importance of data obtained or stored by the gas platform. For example, the higher the importance of the data obtained or stored by the gas platform, the higher the importance score of the gas platform. The smart gas data center may obtain the important score of the target smart gas platform in a plurality of ways. In some embodiments, the importance score may be obtained by manual pre-setting. For example, important scores of different target smart gas platforms may be manually preset.

In some embodiments, the smart gas data center may determine the important score of the target smart gas platform based on a type of gas platform and an amount of historical interaction data of the gas platform.

The type of gas platform refers to a category of the smart gas platform. The type of gas platform may include a smart gas user platform, a smart gas service platform, a smart gas management platform, a smart gas sensing network platform, and a smart gas object platform. More descriptions may be found in FIG. 1 and the related descriptions thereof.

The amount of historical interaction data of the gas platform refers to an amount of data that each smart gas platform has historically interacted with the smart gas data center. In some embodiments, the amount of historical interaction data of the gas platform may be obtained based on an interaction record of the smart gas sensing network platform and/or the smart gas service platform.

In some embodiments, the smart gas data center may pre-record and save a table related to different important scores corresponding to different types of gas platforms and different amounts of historical interaction data of gas platforms respectively in historical statistical data, etc. The smart gas data center may determine the important score of the target smart gas platform based on the type of gas platform and the amount of historical interaction data of the gas platform by looking up the table.

The transmission execution data refers to an instruction related to execution of the data transmission. The transmission execution data may include whether to transmit, an order of transmission, a speed of transmission, etc.

The smart gas data center may determine the transmission execution data in a plurality of ways. In some embodiments, the smart gas data center may determine the transmission execution data based on the transmission load and the importance score of the target smart gas platform. For example, the smart gas data center may construct a query feature vector based on the transmission load and the importance score of the target smart gas platform, and determine the transmission execution data by performing vector matching based on a vector database. The vector database may include a plurality of reference feature vectors and reference transmission execution data corresponding to the plurality of reference feature vectors. The reference feature vector may be constructed based on a historical transmission load, and an importance score of a historical target smart gas platform.

In some embodiments, the smart gas data center may determine a reference feature vector in the vector database that meets a preset condition based on the query feature vector and determine the reference feature vector that meets the preset condition as an associated feature vector. The preset condition refers to a judgment condition used to determine the associated feature vector. In some embodiments, the preset condition may include a vector distance being smaller than a distance threshold, the vector distance being minimum, etc.

In some embodiments, the smart gas data center may determine reference transmission execution data corresponding to the associated feature vector as final transmission execution data.

In some embodiments, the smart gas data center may determine the transmission execution data based on the transmission load, the importance score of the target smart gas platform, and comprehensive query instruction data.

The comprehensive query instruction data refers to an importance score and a volume of requested data of the target smart gas platforms that currently sends data obtaining requests at the same time. In some embodiments, the comprehensive query instruction data may be sent to the smart gas data center via the target smart gas platform.

In some embodiments, the smart gas data center may construct the query feature vector based on the transmission load, the importance score of the target smart gas platform, and the comprehensive query instruction data, and determine the transmission execution data by performing the vector matching based on the vector database. Accordingly, the reference feature vector contained in the vector database may also be constructed based on the transmission load, the important score of the target smart gas platform, and the comprehensive query instruction data. More descriptions regarding the manner for vector matching may be found above.

In some embodiments of the present disclosure, the transmission execution data may be determined based on the transmission load, the importance score of the target smart gas platform, and the comprehensive query instruction data, which is conducive to improving network performance and reliability, thereby better satisfying users' needs.

In some embodiments, the smart gas data center may predict a predicted transmission load at a future time point; and determine the transmission execution data based on a current transmission load, the predicted transmission load, the importance score of the target smart gas platform, and the comprehensive query instruction data.

The predicted transmission load is a transmission load predicted at a future time point. The predicted transmission load may be sequential data at a plurality of future time points. In some embodiments, the smart gas data center may predict the transmission load through a transmission load prediction model.

The transmission load prediction model may be a machine learning model, e.g., a Long Short Term Memory Networks (LSTM) model, or the like, or any combination thereof.

In some embodiments, an input of the transmission load prediction model may include the historical transmission load and the current transmission load, historical comprehensive query instruction data and current comprehensive query instruction data, and an output of the transmission load prediction model may be the predicted transmission load.

In some embodiments, the transmission load prediction model may be obtained by training a plurality of first training samples with a first label.

In some embodiments, the first training sample may include a plurality of sample transmission loads during a sample period of time, and a plurality of pieces of sample comprehensive query instruction data during the sample period of time. The first label may be an actual transmission load at a sample time point after the sample period of time. The sample time point and the sample period of time are historical times. In some embodiments, the first training sample and the first label may be obtained from historical data.

In some embodiments, the smart gas data center may construct the query feature vector based on the current transmission load, the predicted transmission load, the importance score of the target smart gas platform, and the comprehensive query instruction data and determine the transmission execution data by performing the vector matching based on the vector database. Accordingly, the reference feature vector contained in the vector database may also be constructed based on the current transmission load, the predicted transmission load, the important score of the target smart gas platform, and the comprehensive query instruction data. More descriptions regarding the manner for vector matching may be found above.

In some embodiments of the present disclosure, the predicted transmission load may be predicted at a future time point, so that the transmission execution data may be better adjusted accordingly, thereby improving network performance and reliability.

In some embodiments, in response to a determination that the transmission execution data is "transmission data," the smart gas data center may transmit the data to the target smart gas platform according to the determined transmission order and transmission speed of the transmission execution data.

In some embodiments of the present disclosure, the scheduling resource may be determined based on the source platform of the target data, so that the target data of the preset data volume may be obtained from the source platform, so as to avoid storing too much invalid data in the smart gas data center. By determining the extraction feature and value feature of each sub-target data in the target data, the sub-target data can be better stored according to the storage level, and the storage efficiency and reliability can be improved. By determining the transmission execution data based on the transmission load and the importance score of the target smart gas platform, the transmission effect can be better ensured and the operation efficiency of the platform can be improved.

It should be noted that the descriptions regarding the relevant process is intended to be exemplary and illustrative only and does not limit the scope of application of the present disclosure. For those skilled in the art, various modifications and changes to the process may be made under the guidance of the present disclosure. However, these modifications and changes remain within the scope of the present disclosure.

Figure 3:
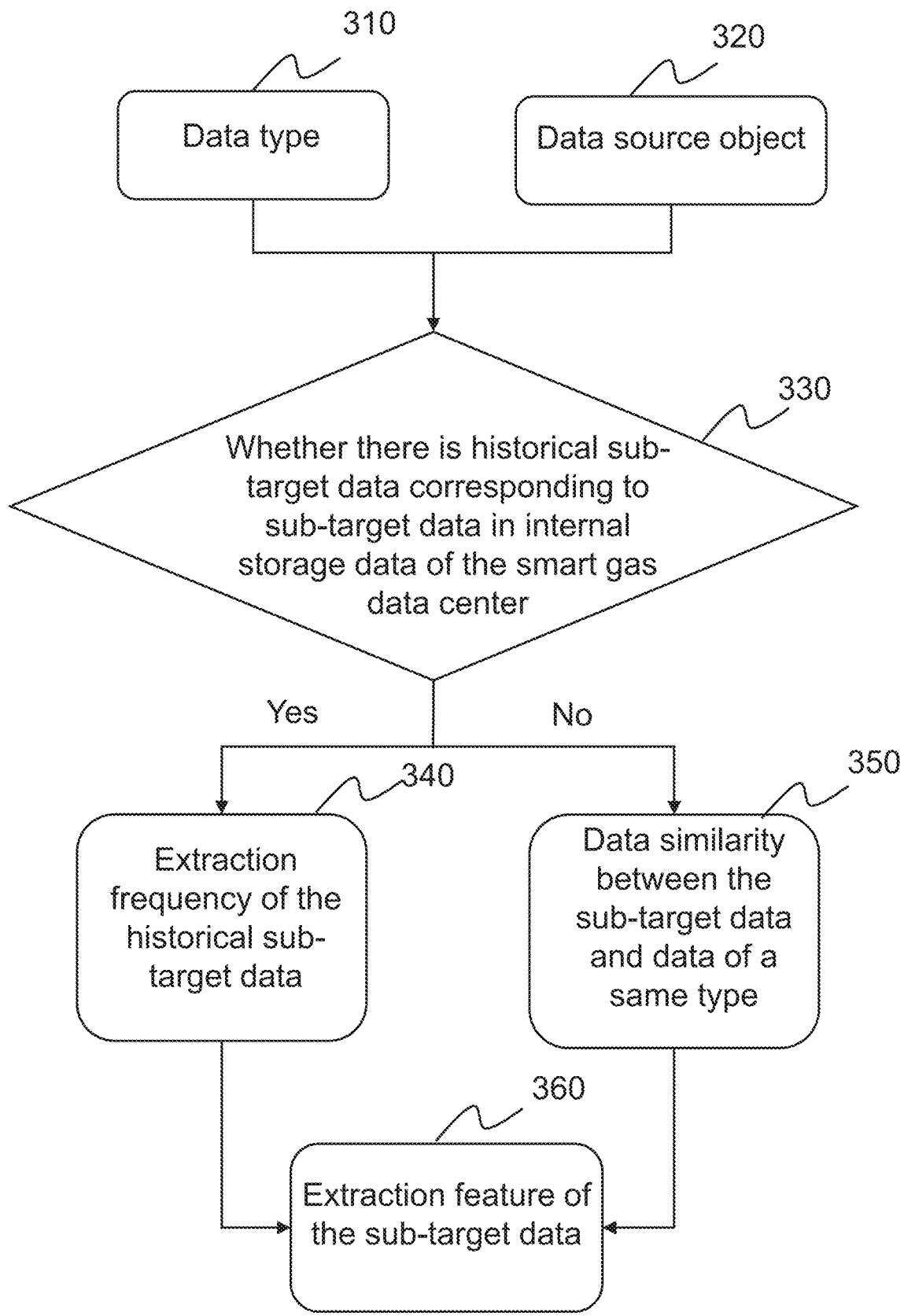
FIG. 3 is an exemplary schematic diagram illustrating determining an extraction feature according to some embodiments of the present disclosure.

FIG. 3 is an exemplary schematic diagram illustrating determining an extraction feature according to some embodiments of the present disclosure.

In some embodiments, as shown in FIG. 3, a smart gas data center may determine whether there is historical sub-target data 330 corresponding to sub-target data in internal storage data of the smart gas data center based on a data type 310 and a data source object 320 of the sub-target data.

In some embodiments, when there is historical sub-target data in the internal storage data with the same data type and data source object of the sub-target data, there is the historical sub-target data corresponding to the sub-target data in the internal storage data of the smart gas data center.

In some embodiments, the smart gas data center may determine the historical sub-target data corresponding to the sub-target data in the internal storage data of the smart gas data center based on the data type 310 and the data source object 320 of the sub-target data; and determine an extraction feature 360 of the sub-target data based on an extraction frequency 340 of the historical sub-target data.

In some embodiments, the data type of the sub-target data may include at least one of gas service data, gas management data, or gas sensing data. The data type may be determined based on a source platform. More descriptions regarding the data type may be found in FIG. 1 and the relevant descriptions thereof.

The data source object is a source from which data is generated. The data source object may include a gas device, a user (including a gas user and a non-gas user), etc. The data source object is related to the source platform. For example, when the source platform is a smart gas sensing network platform, the data source object may be the gas device. As another example, when the source platform is a smart gas service platform, the data source object may be the user.

More descriptions of the sub-target data, the internal storage data, and the extraction frequency may be found in FIG. 2 and the relevant descriptions thereof.

The historical sub-target data corresponding to the sub-target data refers to data with the same data type and data source object of the sub-target data in the internal storage data.

In some embodiments, the smart gas data center may determine the historical sub-target data by matching the data type and the data source object of the sub-target data with the internal storage data in the smart gas data center.

In some embodiments, the smart gas data center may determine the extraction frequency of the historical sub-target data based on historical data. More descriptions regarding the determining the extraction frequency may be found in FIG. 2 and the relevant descriptions thereof.

In some embodiments, when there is no the historical sub-target data corresponding to the sub-target data in the internal storage data of the smart gas data center, the smart gas data center may determine the extraction feature 360 of the sub-target data based on a data similarity 350 between the sub-target data and data of a same type in the internal storage data of the smart gas data center.

The data similarity may be represented by a vector distance. For example, when the data type of the sub-target data is gas device sensing data, a data similarity between the gas device sensing data saved in the internal storage data and the sub-target data may be determined by calculating the vector distance. For example, when the data type of the sub-target data is the gas device sensing data, a feature vector corresponding to the gas device sensing data may be constructed based on a device type of a gas device and the gas device sensing data. As another example, when the data type of the sub-target data is gas user service data, a feature vector corresponding to the gas user service data may be constructed based on a user type and the gas user service data.

In some embodiments, the smart gas data center may determine an extraction frequency of data of the same data type with a highest data similarity as the extraction feature of the sub-target data.

In some embodiments, if there is no historical sub-target data corresponding to the sub-target data and data of the same data type whose data similarity between the sub-target data meets a similarity threshold in the internal storage data, the smart gas data center may determine a value preset by the system or manually as the extraction feature of the sub-target data. The similarity threshold may be predetermined by the system or manually.

In some embodiments of the present disclosure, when there is no historical sub-target data corresponding to the sub-target data in the internally stored data of the smart gas data center, the extraction feature of the sub-target data may be determined by comparing with the sub-target data with data of the same type, so that the extraction feature may be better determined, needs of the user may be predicted accurately, and the efficiency and accuracy of determining a storage level may be increased.

In some embodiments of the present disclosure, the extraction feature of the sub-target data may be determined based on the extraction frequency of the historical sub-target data, so as to determine the extraction feature well-founded, which may predict the needs of the user more accurately and improve the efficiency and accuracy of determining the storage level.

Figure 4:
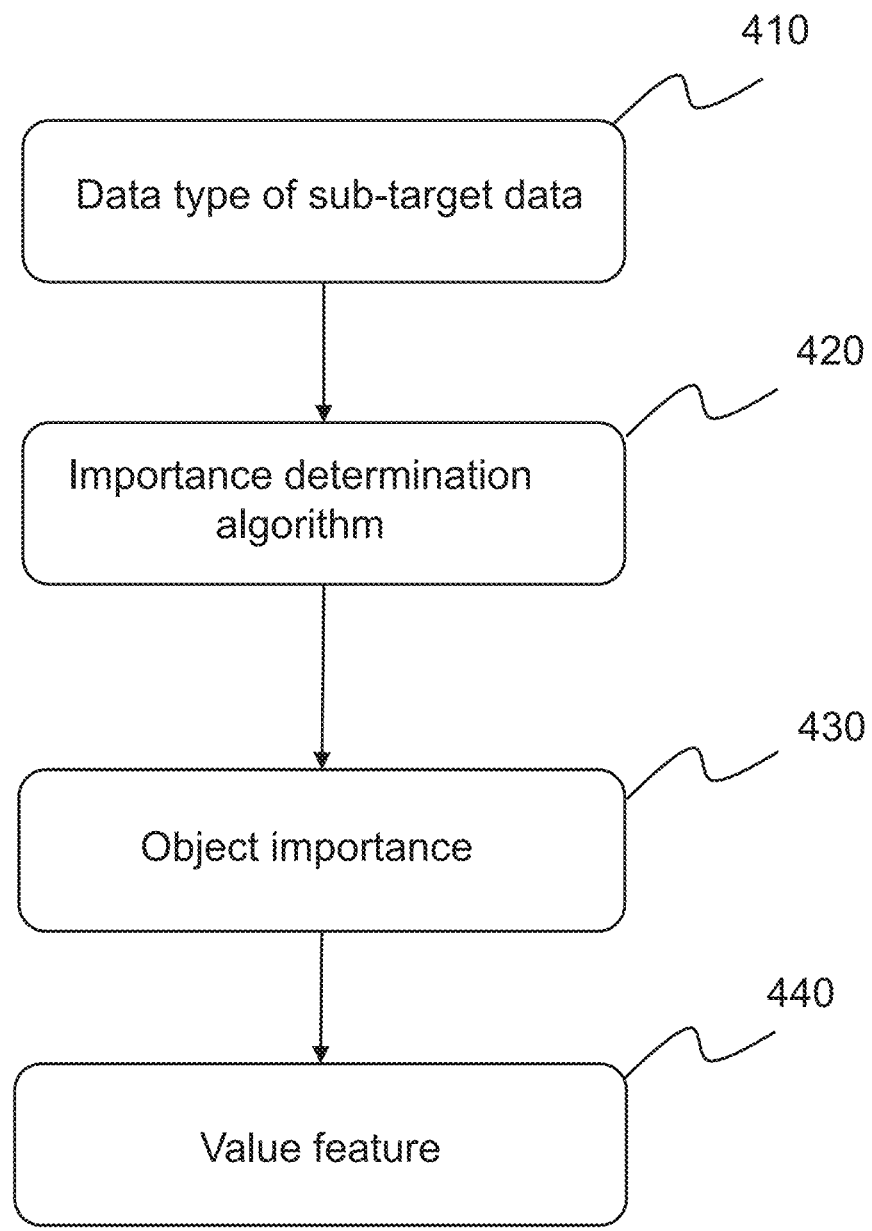
FIG. 4 is an exemplary schematic diagram illustrating determining a value feature according to some embodiments of the present disclosure.

FIG. 4 is an exemplary schematic diagram illustrating determining a value feature according to some embodiments of the present disclosure.

In some embodiments, as shown in FIG. 4, a smart gas data center may determine a value feature 440 of sub-target data based on an object importance 430 of a data source object of the sub-target data.

More descriptions regarding the data source object may be found in FIG. 3 and the related descriptions thereof.

The object importance is used to measure an importance of the data source object. The greater the object importance, the greater the importance of the data source object. The object importance may be determined by pre-labeling.

In some embodiments, when the data source object of the sub-target data is a gas user, the smart gas data center may determine a gas user level of the gas user based on a gas user type, gas usage data, gas payment data, and a geographic location of the gas user. The smart gas data center may determine the object importance of the gas user based on the gas user level and determine the object importance of the gas user as the value feature of the sub-target data.

The gas user type may include a commercial user, a residential user, and an industrial user.

The gas usage data refers to a record of gas use in a recent period of time.

The gas payment data may include a payment record, an overdue record, etc.

The gas user level may reflect quality of the user. The higher the gas user level, the better the quality of the user.

In some embodiments, the smart gas data center may obtain the gas user type, the gas usage data, the gas payment data, and the geographic location of the gas user via a network interface.

In some embodiments, the smart gas data center may determine the gas user level of the gas user through a user importance determination model.

The user importance determination model may be a machine learning model, e.g., a Deep Neural Networks (DNN) model, or the like, or any combination thereof.

In some embodiments, an input of the user importance determination model may be the gas user type, the gas usage data, the gas payment data, and the geographic location of the gas user, and an output of the user importance determination model may be the gas user level.

In some embodiments, the user importance determination model may be obtained by training a plurality of second training samples with a second label.

In some embodiments, the second training sample may include a sample gas user type, sample gas usage data, sample gas payment data, a geographic location where a sample is located, and the second label is a sample gas user level. In some embodiments, the second training sample may be obtained through historical data and the second label may be obtained through manual labeling.

In some embodiments of the present disclosure, the gas user type, the gas usage data, the gas payment data, and the geographic location of the gas user may be processed by the user importance determination model, so that patterns may be found out from a large amount of gas user usage information using a self-learning capability of the machine learning model and an association relationship between the patterns may be obtained, which can improve the accuracy and efficiency of determining the gas user level.

In some embodiments, the smart gas data center may preset a corresponding relationship between different gas user levels and different object importance based on prior knowledge or the historical data. After obtaining the gas user level, the smart gas data center may determine the object importance of the gas user by looking up a table, etc. and take the object importance of the gas user as the value feature of the sub-target data.

In some embodiments, the object importance of the gas user may also be related to a user activity.

The user activity may include a frequency of repair report and a frequency of complaint of the user. In some embodiments, the smart gas data center may determine the user activity through statistics.

In some embodiments, the object importance of the gas user may be determined based on the gas user level, the frequency of repair report, and the frequency of complaint. In some embodiments, the object importance of the gas user may be a weighted sum of the gas user level, the frequency of repair report, and the frequency of complaint, and each weight may be determined based on prior knowledge or the historical data.

In some embodiments of the present disclosure, a gas user with a high gas user level and a high frequency of repair report, and a high frequency of complaint may be considered as an important user and a higher storage level may be assigned to the important user, thereby improving user satisfaction and loyalty and increasing the competitiveness of the gas data center.

In some embodiments, as shown in FIG. 4, the smart gas data center may determine, based on a data type 410 of the sub-target data, a importance determination algorithm 420 corresponding to the data type. The smart gas data center may determine the object importance 430 of the data source object of the sub-target data based on the importance determination algorithm 420.

more descriptions regarding the data type may be found in FIG. 3 and the relevant descriptions thereof.

The importance determination algorithm may be used to determine the object importance of the data source object. Sub-target data of each data type corresponds to one importance determination algorithm.

In some embodiments, when the sub-target data is gas device sensing data or gas device management data, the importance determination algorithm 420 corresponding to the sub-target data is: calculating a weighted result of a device value and a device contribution as the object importance 430. In this case, the device value is a price of the device. The device contribution is a degree to which the device contributes during use. The device value and the device contribution may be determined by the system or manual quantification.

In some embodiments, when the sub-target data is gas safety sensing data or gas safety management data, a importance determination algorithm 420 corresponding to the sub-target data is: calculating a region score of a region where data is collected as the object importance 430. The region score may reflect the importance of a region. For example, the smart gas data center may set a region score of a region with a high population density to be higher than a region with a low population density, and a region score of a region with a big count of devices to be higher than a region with a small count of devices.

In some embodiments, when the sub-target data is gas operation sensing data or operation sensing management data, a importance determination algorithm 420 corresponding to the sub-target data is: calculating a weighted result of an evaluation user importance and a work order evaluation index as the object importance 430. In this case, the evaluation user importance is an importance of a gas user who evaluates a work order, i.e., the object importance when the data source object is the gas user. The work order evaluation index is an absolute value of a difference between an evaluation score of the work order and an average evaluation score of the type of the work order. The evaluation user importance is a weighted sum of the importance of the gas user and the work order evaluation index, and each weight may be preset by the system or manually.

In some embodiments of the present disclosure, the smart gas data center may determine the importance determination algorithm corresponding to the sub-target data based on the data type of the sub-target data, thereby determining the object importance of the data source object of the sub-target data, which may evaluate the object importance of the sub-target data in a targeted manner and better conduct storage level and data access.

In some embodiments, the smart gas data center may directly determine the object importance 430 of the sub-target data as the value feature 440 of the sub-target data. In some embodiments, the smart gas data center may preset a corresponding relationship between different object importance and different value features based on prior knowledge or the historical data, and determine the value feature 440 of the sub-target data based on a currently determined object importance 430 and the corresponding relationship.

In some embodiments of the present disclosure, the value feature of the sub-target data may be determined based on the object importance of the data source object of the sub-target data, so that the importance of the sub-target data can be better evaluated, data can be better accessed, and efficiency and accuracy of data access can be improved.

Having thus described the basic concepts, it may be rather apparent to those skilled in the art after reading this detailed disclosure that the foregoing detailed disclosure is intended to be presented by way of example only and is not limiting. Although not explicitly stated here, those skilled in the art may make various modifications, improvements and amendments to the present disclosure. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various parts of this specification are not necessarily all referring to the same embodiment. In addition, some features, structures, or features in the present disclosure of one or more embodiments may be appropriately combined.

Furthermore, unless explicitly stated in the claims, the order of processing elements and sequences, the use of alphanumeric, or the use of other names described in the present disclosure is not intended to limit the order of the processes and methods of the present disclosure. While the above disclosure discusses some presently believed useful embodiments of the invention by way of various examples, it is to be understood that such details are for purposes of illustration only and that the appended claims are not limited to the disclosed embodiments, but on the contrary, the claims are intended to cover all modifications and equivalent combinations that come within the spirit and scope of the embodiments of the present disclosure. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. However, this approach of disclosure does not imply that the features required by the present disclosure are more than the features recited in the claims. Rather, claimed subject matter may lie in less than all features of a single foregoing disclosed embodiment.

In some embodiments, the numbers expressing quantities or properties used to describe and claim certain embodiments of the present disclosure are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the present disclosure are approximations, the numerical values set forth in the specific examples are reported as precisely as practicable.

Each patent, patent application, patent application publication, and other material, such as article, book, specification, publication, document, etc., cited in the present disclosure is hereby incorporated by reference in its entirety. Historical application documents that are inconsistent with or conflict with the content of the present disclosure are excluded, and documents (currently or later appended to the present disclosure) that limit the broadest scope of the claims of the present disclosure are excluded. It should be noted that if there is any inconsistency or conflict between the descriptions, definitions, and/or terms used in the accompanying materials of the present disclosure and the contents of the present disclosure, the descriptions, definitions, and/or terms used in the present disclosure shall prevail.

Finally, it should be understood that the embodiments described in the present disclosure are only configured to illustrate the principles of the embodiments of the present disclosure. Other modifications are also possible within the scope of the present disclosure. Therefore, as an example and not a limitation, alternative configurations of the embodiments of the present disclosure may be regarded as consistent with the teaching of the present disclosure. Correspondingly, the embodiments of the present disclosure are not limited to the embodiments clearly introduced and described in the present disclosure.

What is claimed is:

1. A method for information storage management based on a smart gas data center, comprising:
   when a smart gas platform stores data in the smart gas data center,
      determining, by the smart gas data center, a scheduling resource of target data based on a source platform corresponding to the target data;
      obtaining, by the smart gas data center, the target data of a preset data volume from the source platform based on the scheduling resource;
      determining, by the smart gas data center, historical sub-target data corresponding to sub-target data of the target data in internal storage data of the smart gas data center based on a data type and a data source object of the sub-target data;
      determining, by the smart gas data center, the extraction feature of the sub-target data based on an extraction frequency of the historical sub-target data;
      determining, by the smart gas data center, a value feature of the sub-target data based on an object importance of a data source object of the sub-target data; and
      determining, by the smart gas data center, a storage level of the sub-target data based on the extraction feature and the value feature of the sub-target data and storing the sub-target data in the smart gas data center according to the storage level; and
   when the smart gas platform reads the data from the smart gas data center,
      determining, by the smart gas data center, transmission execution data based on a transmission load and an importance score of a target smart gas platform and transmitting the data to the target smart gas platform based on the transmission execution data.

2. The method of claim 1, wherein the method further comprises: determining the extraction feature of the sub-target data based on a data similarity between the sub-target data and data of a same type of in the internal storage data of the smart gas data center when there is no the historical sub-target data corresponding to sub-target data in the internal storage data of the smart gas data center, wherein the data type includes at least one of gas service data, gas management data, or gas sensing data.

3. The method of claim 1, further comprising:
determining the extraction feature of the sub-target data based on a data volume of extracted data of the historical sub-target data.

4. The method of claim 1, further comprising:
determining, based on a data type of the sub-target data, an importance determination algorithm corresponding to the sub-target data; and
determining the object importance based on the importance determination algorithm.

5. The method of claim 4, wherein the object importance is related to a user activity.

6. The method of claim 4, wherein when the sub-target data is gas device sensing data or gas device management data, the importance determination algorithm corresponding to the sub-target data is:
determining the object importance based on a weighted result of a device value and a device contribution.

7. The method of claim 4, wherein when the sub-target data is gas safety sensing data or gas safety management data, the importance determination algorithm corresponding to the sub-target data is:
determining the object importance based on a region score of a region where the data is collected.

8. The method of claim 4, wherein when the sub-target data is gas operation sensing data or operation sensing management data, the importance determination algorithm corresponding to the sub-target data is:
determining the object importance based on a weighted result of an evaluation user importance and a work order evaluation index.

9. The method of claim 1, wherein the determining a storage level of the sub-target data based on the extraction feature and the value feature of the sub-target data includes:
determining an information feature of the sub-target data based on the extraction feature and the value feature of the sub-target data; and
determining the storage level of the sub-target data based on the information feature.

10. The method of claim 9, wherein the information feature is related to an importance score of a source platform of the sub-target data.

11. The method of claim 1, further comprising:
determining transfer data in internal storage data of the smart gas data center before storing the sub-target data in the smart gas data center according to the storage level; and
storing the sub-target data in the smart gas data center according to the storage level after performing preset processing on the transfer data.

12. The method of claim 1, wherein the determining transmission execution data based on a transmission load and an important score of a target smart gas platform includes:
determining the importance score of the target smart gas platform based on a gas platform type and an amount of historical interaction data of the gas platform; and
determining the transmission execution data based on the transmission load, the importance score of the target smart gas platform, and comprehensive query instruction data.

13. The method of claim 12, further comprising:
predicting a predicted transmission load at a future time point through a transmission load prediction model, the transmission load prediction model being a machine learning model, wherein
the transmission load prediction model is obtained by training a plurality of first training samples with a first label;
the plurality of first training samples include a plurality of sample transmission loads during a sample period of time, and a plurality of pieces of sample comprehensive query instruction data during the sample period of time; and
the first label is an actual transmission load at a sample time point after the sample period of time; and
determining the transmission execution data based on a current transmission load, the predicted transmission load, the importance score of the target smart gas platform, and the comprehensive query instruction data.

14. A non-transitory computer-readable storage medium storing computer instructions, wherein when reading the computer instructions in the storage medium, a computer executes the method of claim 1.

15. The method of claim 1, wherein the method further comprises:
determining the object importance of the data source object of the sub-target data based on a gas user level of a gas user.

16. The method of claim 15, wherein the method further comprises:
determining the gas user level through a user importance determination model, wherein
the user importance determination model is a Neural Network model;
the user importance determination model is obtained by training a plurality of second training samples with a second label; and
the second training sample includes a sample gas user type, sample gas usage data, sample gas payment data, a geographic location where a sample is located, and the second label is a sample gas user level.

* * * * *